Nov. 18, 1930.   M. DE GRAAF   1,782,197
HUMIDIFIER
Filed Feb. 25, 1928
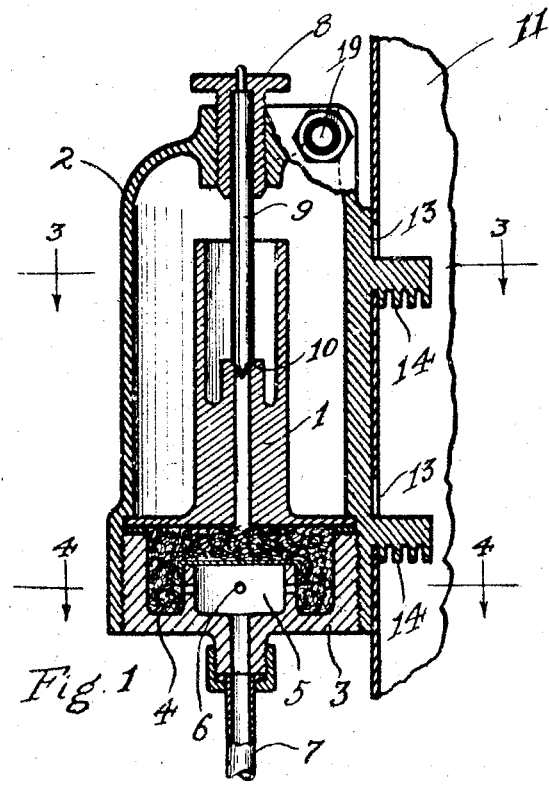
Fig. 1
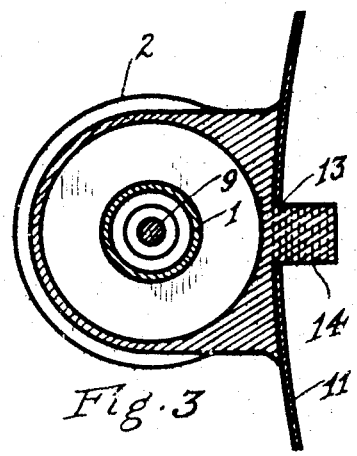
Fig. 3
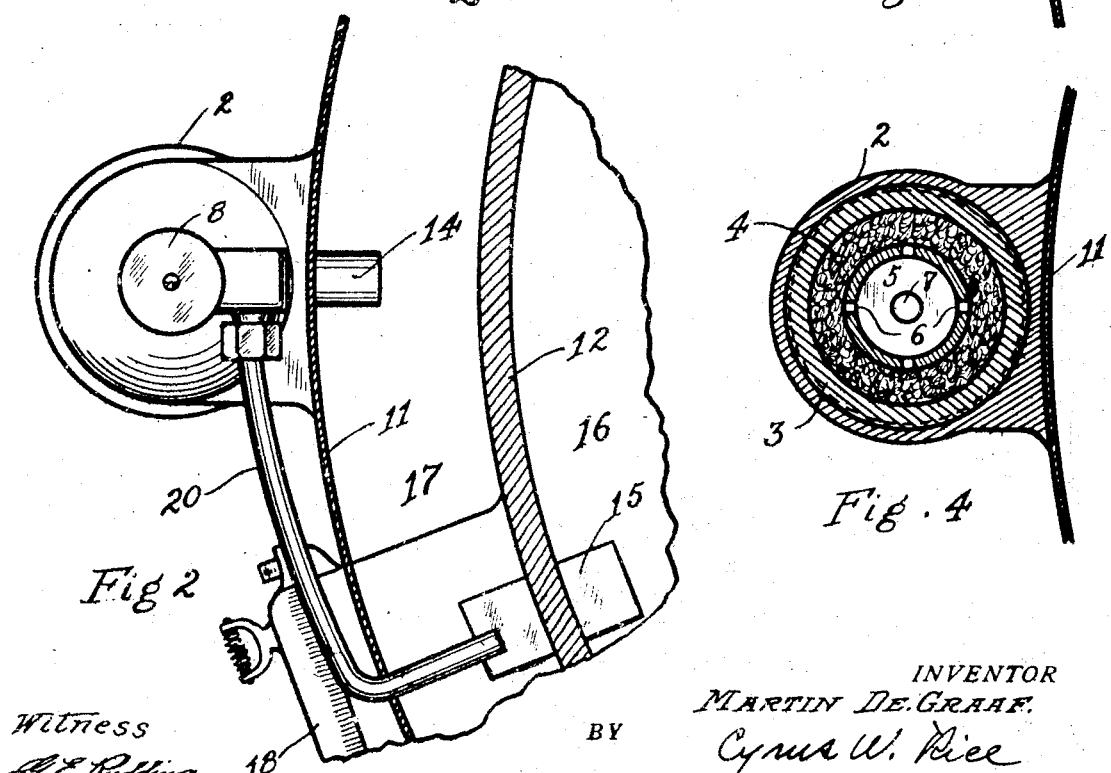
Fig. 2
Fig. 4
Witness
INVENTOR
MARTIN DE GRAAF.
BY
Cyrus W. Rice
ATTORNEY Patented Nov. 18, 1930

1,782,197

UNITED STATES PATENT OFFICE

MARTIN DE GRAAF, OF GRAND RAPIDS, MICHIGAN

HUMIDIFIER

Application filed February 25, 1928. Serial No. 256,861.

This invention relates to humidifying devices and more particularly to such devices as are used in conjunction with heating plants where it is desired to humidify the heat fed to homes, factories or other buildings.

The main objects of this invention are to provide an improved form of humidifying device for use in conjunction with heating plants wherein a substantially constant humidity is maintained irrespective of the amount of heat delivered; to provide a humidifying device which is automatically regulated by the varying thermal conditions within the heating plant; and to provide a generally improved device of this character which may be economically manufactured, cheaply marketed and conveniently installed for service.

An illustrative embodiment of the invention is shown in the accompanying drawings wherein:

Figure 1 is a vertical central sectional view of the device mounted on the casing of a hot air heating plant;

Figure 2 is a top plan view of the device mounted on the casing of a hot air heating plant here shown in section;

Figure 3 is a sectional view thereof taken on line 3—3 of Figure 1; and

Figure 4 is likewise a sectional view taken on line 4—4 of Figure 1.

In the construction shown in the drawings, a metallic container is mounted on the air casing of a hot air furnace. The container is provided with a water inlet and outlet and with a valve for controlling or regulating the flow of water therethrough. The needle valve is mounted on the head of the container and is caused to move axially to open or closed position during the longitudinal expansion and contraction of the container, the container being thermally responsive to the varying heat conditions within the furnace. When the valve is open, water is permitted to flow through the container and drip or spill on an evaporating plate within the air casing which surrounds the combustion chamber of the furnace.

Referring to the drawings, an elongated vertically disposed tubular core 1 for permitting the passage of water therethrough is secured within an elongated vertically disposed cylindrical container formed by the metal hood 2 and the plug 3 which is screwed thereto. Packing or wicking 4 is stuffed into a recess within the plug to filter the water and also to dampen or partially counteract the force of the flow of water under pressure from the water main. This packing or wicking surrounds or embraces the water diverting head 5 which is provided with a plurality of water jets 6 and which communicates with the water inlet pipe 7.

The head of the container has an adjustable screw 8 to which is rigidly secured a needle valve 9 which variable shifts axially relatively to the valve seat 10 to open and close the valve during the longitudinal expansion and contraction of the thermally responsive container.

The air casing 11 which spacedly surrounds the combustion chamber wall 12 is provided with openings or apertures 13 in order that the container 2 may be adjustably secured thereto by means of the laterally disposed toothed arms 14. A horizontally disposed evaporating plate 15 is secured to the wall 12 inside the feed door 18 and projects laterally on opposite sides of the wall 12 into the combustion chamber 16 and the air space 17. The water outlet 19 communicates with the air space 17 through the pipe 20 and water flowing therefrom spills or drips onto the evaporating plate.

In operation, the device is installed as heretofore described. When the air within the air space 17 becomes sufficiently hot, the heat of convection and radiation expands the thermally responsive container longitudinally. The needle valve is thereby lifted from its seat and its axial movement permits the water to flow through the container to drip or spill onto the plate where it is evaporated and delivered with the heated air to the room to be heated and humidified. The cold water in the tubular core prevents the relative longitudinal expansion of the core and the valve is therefore thermally controlled to permit the delivery of a greater or less quantity of water depending upon the thermal conditions within the combustion chamber. Thus it will be seen that the device functions to deliver a greater quantity of water to be evaporated when there is a relatively hot fire and a lesser quantity of water when there is a smaller fire.

While but one specific embodiment of the invention is herein shown and described, it will be understood that numerous details herein shown and described may be altered or omitted without departing from the spirit of the invention as defined in the following claims.

I claim:

1. A humidifier of the class described comprising an outer container of thermally expansive material provided with means for securing it to the casing of a hot air heater or the like in heat absorbing relation to said casing, said container having a water inlet and a water outlet for supplying water to the hot air heater, an interiorly arranged valve mounted on the said container at one end thereof, and a cooperating valve seat on the opposite end of said container for controlling said water inlet, said valve and valve seat being in spaced relation with the walls of the container so as to be surrounded by water and thereby shielded from external heat.

2. A humidifier of the class described, comprising an outer container of thermally expansive material provided with toothed projections adapted to engage the casing of a hot air heater to secure said container in position to receive heat from said casing, said container having a water inlet and a water outlet for supplying water to the hot air heater, an interiorly arranged valve mounted on the said container at one end thereof, and a cooperating valve seat on the opposite end of said container for controlling said water inlet, said valve and valve seat being in spaced relation with the walls of the container so as to be surrounded by water and thereby shielded from external heat.

In testimony whereof I have hereunto set my hand at Grand Rapids, Michigan, this 15th day of February, 1928.

MARTIN DE GRAAF.